UNITED STATES PATENT OFFICE.

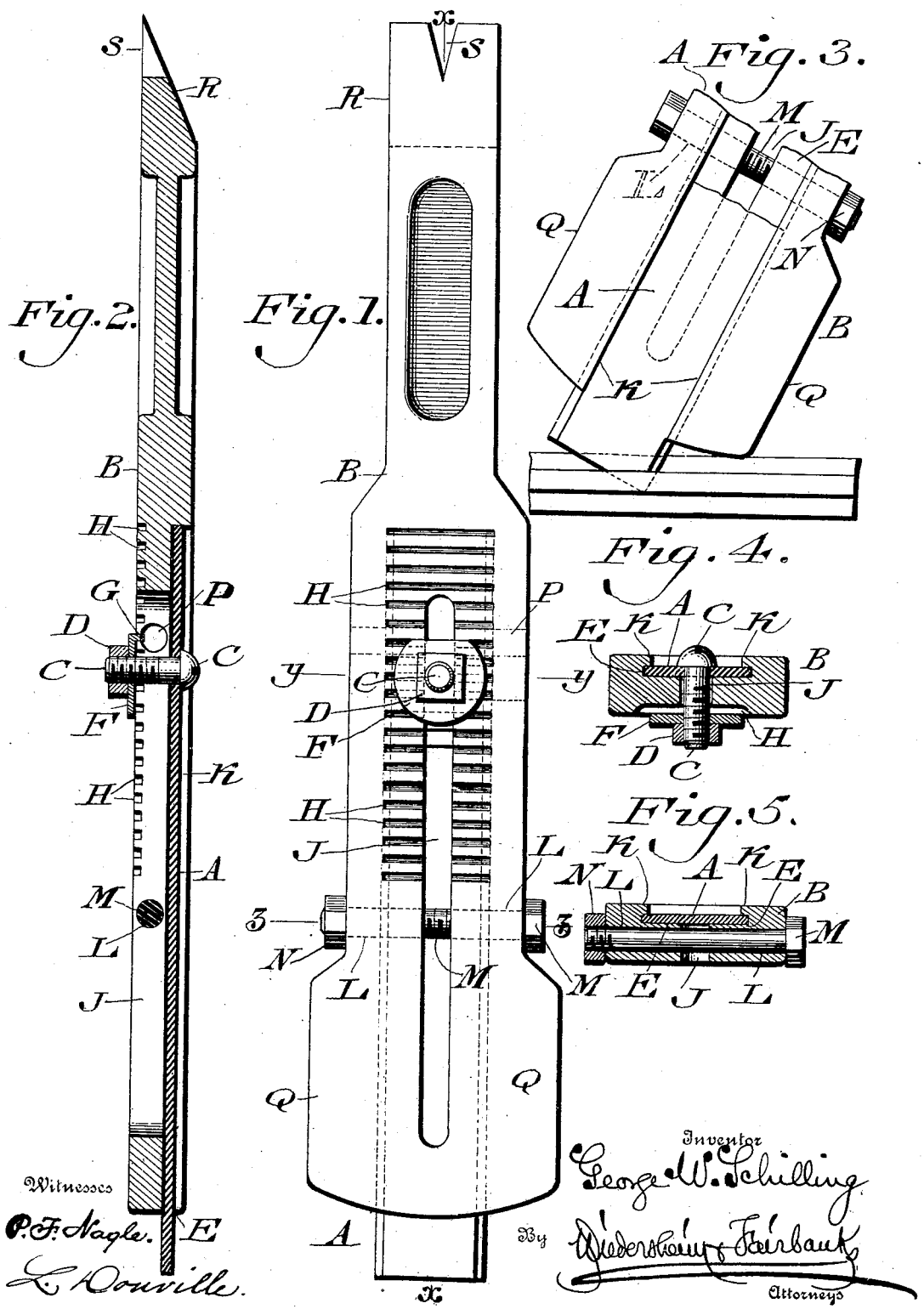

GEORGE W. SCHILLING, OF PHILADELPHIA, PENNSYLVANIA.

CUTTER FOR TONGUED BOARDS.

No. 862,761.  Specification of Letters Patent.  Patented Aug. 6, 1907.

Application filed October 24, 1906. Serial No. 340,269.

*To all whom it may concern:*

Be it known that I, GEORGE W. SCHILLING, a citizen of the United States, residing in the city and county of Philadelphia, State of Pennsylvania, have invented a new and useful Cutter for Tongued Boards, of which the following is a specification.

My invention consists of a cutter for tongues of flooring boards, partitions, etc., the same embodying a blade which is adapted to be driven into the tongues, a stock with which the blade is adjustably connected, means for bracing the stock and details of construction as will be hereinafter described and claimed.

Figure 1 represents a side elevation of a cutter embodying my invention. Fig. 2 represents a longitudinal section thereof on line $x$—$x$ Fig. 1. Fig. 3 represents a side elevation of a portion showing the cutter in a different position from that shown in Fig. 1. Fig. 4 represents a transverse section on line $y$—$y$ Fig. 1. Fig. 5 represents a transverse section on line $z$—$z$ Fig. 1.

Similar letters of reference indicate corresponding parts in the figures.

A designates a blade, and B designates a stock which carries the same and with which it is connected by means of the bolt C and nut D, said blade occupying the recess E in the side of said stock. Interposed between said nut D and the blade is the washer F which is formed with the inturned lip G, the latter being adapted to enter either of the recesses H in the adjacent face of the stock, it being evident that when the blade is adjusted, the lip G fitted in the relative recess H and the nut D tightened, the blade is prevented from slipping.

The stock is formed with a longitudinally extending recess or slot J, which permits sliding motions of the bolt C in the stock during the adjustment of the blade, it being evident that the blade may be set further from or nearer to the lower end of the stock so as to penetrate the wood or board to different depths.

The walls of the recess E in the stock are extended inwardly or towards each other forming the flanges K which overhang the side portions of the blade, and thus assist in more firmly connecting the blade with the stock, and better enabling it to resist any lateral strain to which it may be subjected when in use.

In order to prevent spreading of the sides of the stock owing to the slot J, I form transversely extending openings L in said sides and pass therethrough the bolt M and apply the nut N, which when tightened braces the stock, the effect of which is evident.

For additionally bracing the stock, other openings such as P are formed in the stock above the openings L, to receive another bolt similar to bolt M, and co-act with the latter if so desired.

The lower portion of the stock has on opposite sides thereof, the heads Q, Q either of which may be struck by a hammer or other implement so as to drive the blade into the wood or board, either to the right or left according to requirements.

The end of the stock opposite to the heads Q, Q, is beveled or sloping, forming the pinch bar R and also recesses forming the claw S.

The blade is sharpened on both sides so as to cut in either direction, it being seen that when the device is to be operated, the blade is inserted between boards and driven into a tongue thereof, thus severing or cutting the latter, then the stock may be driven ahead by the blows of a hammer or other implement, thus continuing the cutting, or the tool may be turned after the manner of a lever, its lower edge of the stock then rocking on the top of the boards, thus causing the withdrawal of the point of the blade when the tool may be advanced and the blade again driven into position, thus again cutting or severing the tongue when the tool may be operated as before and the cutting continued.

When the work is completed, the blade emerges from the tongue and so the tool may be removed.

Having thus described my invention, what I claim as new and desire to secure by Letters Patent, is:—

1. In a cutter for tongued boards, a blade, a stock adapted to carry the same, and provided with projecting heads a device on said blade passed through a slot in said stock, and means on said device adapted to engage different portions of said stock for adjustably holding the blade in position.

2. In a cutter for tongued boards, a blade, a stock, the latter being provided with a series of recesses in a side thereof, a bolt adapted to be connected with said blade, a device on said bolt having a portion parallel with the bolt and adapted to engage with said recesses, and means for tightening said bolt and consequently said device.

3. In a cutter for tongued boards, a stock having a longitudinally extending slot therein, and heads upon opposite sides of the lower portion a blade mounted on said stock, a bolt connected with said blade, the same being adapted to occupy said slot and a washer on said bolt, said washer being adapted to adjustably interlock with said stock.

4. In a cutter for tongued boards, a blade, a stock having projecting heads on its lower portion and adapted to carry said blade, the same having a series of recesses in a side thereof, a washer mounted on said bolt and means for tightening the latter, said washer being provided with a projecting member parallel with the bolt adapted to interlock with said stock in either of the recesses therein.

5. In a cutter for tongued boards, a blade, a stock on which the same is carried, said stock having a longitudinally extending slot therein, a bolt adapted to connect said blade with said stock, said slot being adapted to receive said bolt, a washer on said bolt and having a portion parallel therewith to engage the stock and means extending transversely across said bolt for bracing said stock on opposite sides thereof.

6. In a cutter for tongued boards, a stock, a blade adapted to be connected with said stock, and adjustably held within the width thereof and having its cutting portion project from an end thereof, and blow-receiving heads on opposite sides of the stock.

7. In a cutter for tongued boards, a stock, a blade, said stock having a recess therein to receive said blade, means passed through the stock parallel with said blade for bracing the stock, and flanges continuous of the walls of said recess adapted to overhang the sides of said blade.

GEORGE W. SCHILLING.

Witnesses:
JOHN A. WIEDERSHEIM,
WM. CANER WIEDERSEIM.